Jan. 3, 1939. J. M. BOVEE ET AL Re. 20,959

ROLL COVER FOR TYPEWRITERS, ETC

Original Filed May 26, 1934 2 Sheets-Sheet 1

Inventor

Jess M. Bovee

Mary Jane Bovee

By P. J. Elliott

Attorney

Jan. 3, 1939. J. M. BOVEE ET AL Re. 20,959
ROLL COVER FOR TYPEWRITERS, ETC
Original Filed May 26, 1934 2 Sheets-Sheet 2
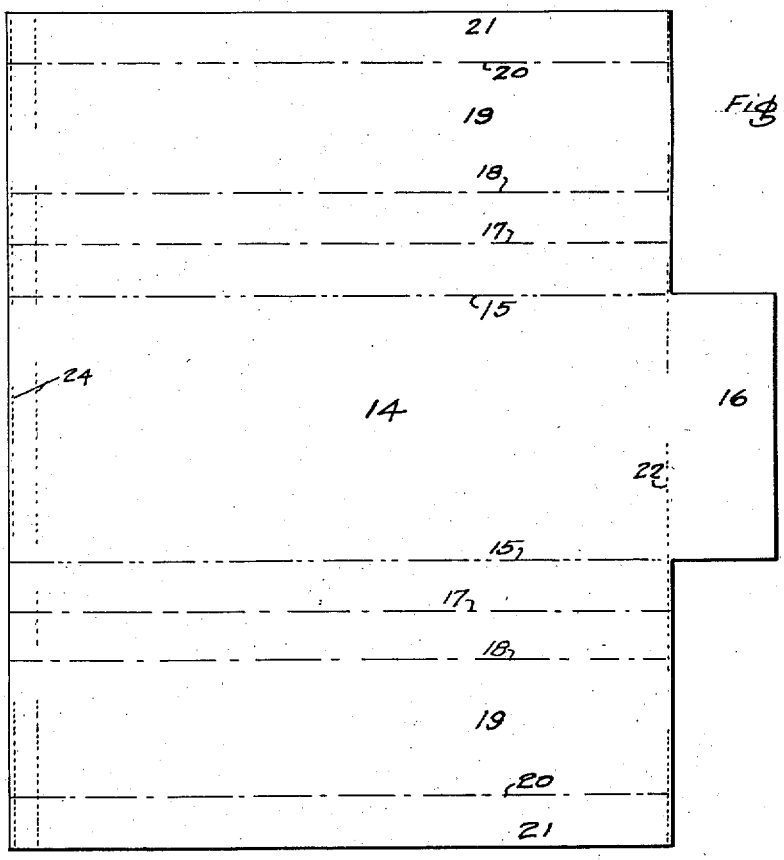
Fig. 7
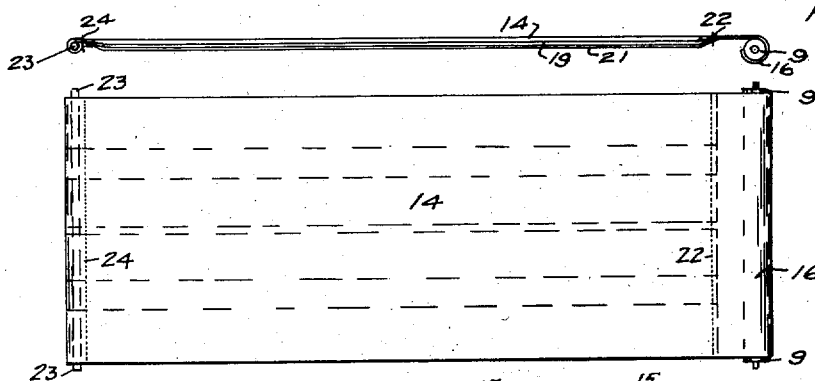
Fig. 8
Fig. 9
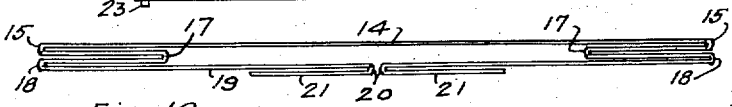
Fig. 10
Inventor
Jess M. Bovee
Mary Jane Bovee
By
Attorney Reissued Jan. 3, 1939

Re. 20,959

UNITED STATES PATENT OFFICE 20,959

ROLL COVER FOR TYPEWRITERS, ETC.

Jess M. Bovee and Mary Jane Bovee,
San Francisco, Calif.

Original No. 2,008,412, dated July 16, 1935, Serial No. 727,780, May 26, 1934. Application for reissue April 9, 1937, Serial No. 137,553

11 Claims. (Cl. 45—68.1)

Our invention relates to devices for protecting office machines, such as typewriters, adding machines, accounting machines, calculating machines, and other similar machines, from the dust when not in use.

The objects of our invention are to provide such a cover, first, as will be out of sight and out of the way when it is not in use; second, as will take up very litle room when not in use; third, which may be incorporated as a part of the machine or which may be attached to a machine; fourth, which folds up automatically when removed from operative position and which rolls up automatically and smoothly out of the way, when so folded; and fifth, which is simple to make, easy to attach to a machine and to operate, and effective in use.

We attain these and other objects, such as will appear from the description, by the devices, mechanisms and arrangements illustrated in the accompanying drawings in which Fig. 1 is a side elevation of a machine showing our invention applied thereto and rolled away to permit the free use of the machine;

Fig. 7 is a plan view of our improved cover before it is folded and applied to the roller, and showing the lines on which it is to be folded and sewed;

Fig. 8 is a side elevation of our improved cover folded and sewed and applied to the spring roller;

Fig. 9 is a top plan view thereof; and

Fig. 10 is a diagrammatic end elevation of our improved cover to show the manner and form of its folding.

Similar numerals of reference refer to similar parts throughout the several views.

Figure 3:
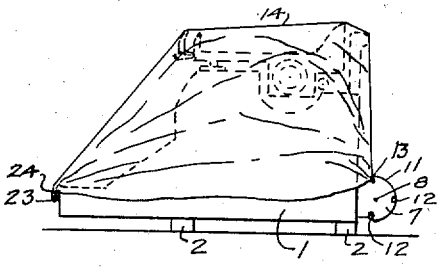
Fig. 3 is a similar view showing our improved cover fully applied to cover the machine.

Our invention is illustrated as applied to a typewriter but it is to be understood that, with appropriate changes in dimensions, the cover may be applied to any desired device or machine, such as those indicated in the above general statement. Also, the form illustrated is that in which the cover and its container are secured to such a machine as already made, but it is to be understood that the roller on which the cover is mounted may be permanently incorporated within the frame of the machine, the cover emerging therefrom through a suitable slot, or the container may be a permanent part of the machine.

Referring now to the drawings, the machine frame 1 is mounted on suitable cushioned legs 2. A vertical fastener plate 3, having horizontal fastening arms 4, which are adapted to be secured in place between the frame 1 and the said legs 2, extends across the machine 1. This plate 3 is substantially as long as the width of the machine frame 1 and is positioned at the rear thereof on a level with the base thereof. A vertical carrier plate 5 is secured to the fastening plate 3 by means of suitable bolts 6. In some cases the construction of the frame 1 is such that the carrier plate 5 may be secured directly to the rear of the said frame 1 without using the fastening plate 3. The carrier plate 5 is provided with two ears 7, one at each end, extending rearwardly therefrom and shaped substantially as shown in the drawings. The ears 7 are provided with suitable bearing holes 8 adapted to receive and support the end trunnions of a suitable spring roller 9. The hollow spring roller 9 is not illustrated in detail since it is of the well-known type and of the usual construction, having one trunnion journaled in one ear 7 and having an helical spring 10 mounted within it, said spring being attached at its inner end to the said roller 9 and at its other end to the other trunnion, which is held from rotation by the other ear 7 of the container. The roller is also provided with suitable holding dogs, not shown, mounted in the usual way to prevent its undesired rotation. A metal cover 11 lies on the outside edges of the ears 7 and is provided with suitable clips 12 adapted to hold it in place and to stiffen the ears 7 laterally, said clips permitting the removal of the cover 11 when desired. The cover 11 leaves a space 13 between the frame 1 and the upper edge of the metal cover, forming a slot through which our improved machine cover passes to or from the spring roller 9, on which it is rolled.

Our improved typewriter cover is made of suitable cloth or fabric and is cut substantially as shown in Fig. 7. The central part 14, between the two lines 15, is slightly narrower than the width of the machine to be covered, and is provided with a tail 16, of the same width, which is adapted to be secured to the outside of the spring roller 9. A pleat is formed on each side of the central part 14 by creases made on the corresponding lines 17 and 18. The side panels 19 extend from the folds 18 to the side folds 20, a distance substantially equal to one-half of the width of the central part 14, and are adapted to lie immediately under the said central part 14 (Fig. 10). The edge 21 is about the same width as either of the two elements of the pleats. The width of the pleat elements between the creases 15 and 17, and 17 and 18 will vary with the particular machine to be covered.

It is to be observed that the cover thus essentially consists of a strip of fabric folded to form a plain central portion and a series of expansible pleats on each side of the central portion, each end of the folded strip having the pleats immovably secured together at such ends by stitching extending through all layers of the fabric at such ends.

When the cloth has been cut and folded as above described, the rear or inner end is sewed by a row of stitching on the line 22, thus securing all the parts together in front of the tail 16. Similarly the front or outer end of the cover is turned over a rod 23 and is stitched on the line 24, thus securing the rod to the cover and securing all the parts together along the front line. The rod 23 is longer than the width of the central part 14 of the cover and extends out on each side thereof when sewed in place.

Figure 1:
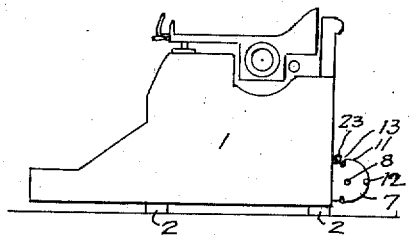
Figure 2:
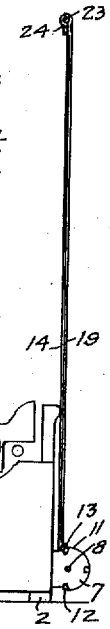
Fig. 2 is a similar view showing our improved cover being unrolled from said stowed away condition.
Figure 4:
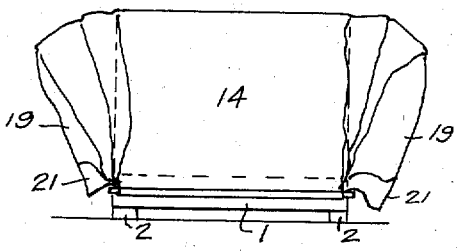
Fig. 4 is a front elevation of the machine when so covered.
Figure 5:
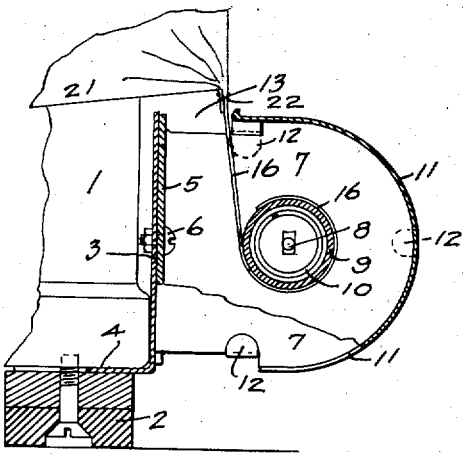
Fig. 5 is a side elevation, partly in section, showing the container for our improved cover.
Figure 6:
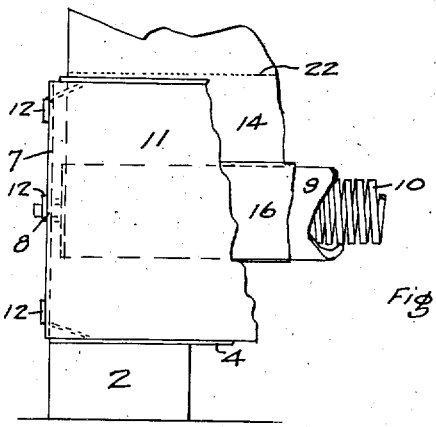
Fig. 6 is a rear elevation of one end thereof.

The operation of our improved machine cover is briefly as follows: It is noted that in Fig. 1 the entire cover is stowed away within the container by being rolled on the spring roller 9, and that the rod 23 extends out laterally to lie on top of the ears 7 of the container. By grasping the said rod 23 and raising it vertically (Fig. 2) the entire cover is unrolled. The cover is allowed to recede slowly until the dog on the spring roller 9 catches and prevents its being further drawn back; then the rod 23 is carried forward over the machine and allowed to rest in front thereof; then the sides, which lie under the cover thus placed, are drawn out laterally and draped over the parts of the machine extending out beyond the sides of the frame 1. In this position it will be noted that, though the side strips 20 and 21 have a shorter distance to pass from the rear to the front, they actually pass about as far as the central part 14 because the sewing seams 22 and 24 attach said part to the center part 14, and while the said center part 14 passes over the top of the machine, the said sides pass from the center of the rear around the side to the center of the front of the machine.

Now when it is desired to stow the cover away, all that it is necessary to do is to raise the stiffening rod 23 vertically and the sides of the cover will pull away from the machine, and, at once, and automatically, will assume their proper positions for being rolled (Fig. 2) and then, by pulling upward on the said rod 23 to release the roller dog, the entire cover will be withdrawn into the container by being rolled neatly on the said spring roller. We have found that, by folding the cover in the manner above described, it will pass on to the roller without bunching or unnecessary wrinkling.

It is to be understood that many variations may be made in the embodiment of our invention without departing from the spirit thereof as outlined in the appended claims, and it will be evident to one skilled in the art that the principal advantages of our invention may be enjoyed without using every feature thereof.

Having described our invention, what we claim and desire to secure by Letters Patent, is:

1. A roll cover for machines comprising a spring roller mounted on the rear of the machine; a cloth cover secured to said spring roller and of width greater than the width of said roller and folded in on itself between its ends, said folds being secured together at its ends; and stiffening means extending across the outer end of said cover.

2. A roll cover for machines as set forth in claim 1, wherein said cloth cover is pleated at its folded edges.

3. A roll cover for machines comprising a spring roller mounted on the rear of the machine; a cloth cover secured at the center of its rear edge to said spring roller and of width greater than the width of said roller, and having its ends folded under on itself, thereby forming side panels, with pleats folded between the side panels and the center portion; and stiffening means extending across the outer end of said cover.

4. A roll cover for machines as set forth in claim 3, wherein the side panels extend from the pleats substantially to the center of the center part of the cover, and on the under side thereof.

5. A roll cover for machines as set forth in claim 3, wherein said cloth cover is of a width greater than twice the width of said roller, and the side panels extend from the pleats substantially to the center of the center part of the cover, and on the under side thereof.

6. A roll cover for machines, comprising a carrier plate secured to the rear of the machine; a pair of ears extending rearward from the ends of said carrier plate; a metal cover mounted on said ears and forming therewith a container; a spring roller mounted between said ears and in the container; a cloth cover secured to said spring roller and of a width greater than the width of said roller and folded in on itself between its ends, said ends being sewed in folded condition; and a rod sewed into the outer end of said cover and extending beyond its folded edges.

7. A roll cover for machines, comprising a fastener plate secured to the rear legs of the machine; a carrier plate secured to said fastener plate; a pair of ears extending rearward from the ends of said carrier plate; a metal cover mounted on said ears and forming therewith a container; a spring roller mounted between said ears and in the container; a cloth cover for the machine secured to said spring roller and of width greater than twice the width of said roller and folded in on itself between its ends, said ends being sewed in folded condition; and a rod sewed into the outer end of said cover and extending beyond its folded edges.

8. A cover for office machines comprising a rectangular flat cloth cover of a length to go over the machine, said cover being of a width greater than the machine and folded longitudinally inward on itself to form expansible pleats along side margins between its ends, the folds being secured in place at the ends of the cover only as by sewing transversely of the folds to the central unfolded portion of the cover, and the folds being free between those points, whereby when the cover is stretched longitudinally the folds will automatically flatten in place against the central portion of the cover, and a bar extending across the end of the thus folded cover transversely of the folds and upon which the folded cover is adapted to be rolled.

9. A cover for office machines comprising a rectangular flat cloth cover of a length to go over the machine, said cover being of a width greater than the machine and folded longitudinally back and forth and inward on itself to form a plurality of expansible pleats along both side margins between its ends, the folds being secured in place at the ends of the cover only as by sewing transversely of the folds to the central unfolded portion of the cover, and the folds being free between the secured ends, whereby when the cover is stretched longitudinally the folds will automatically flatten in place against the central portion of the cover, and a bar at opposite ends respectively of the cover extending transversely of the folds across the end of the folded cover.

10. A cover for office machines as specified in claim 8 wherein the marginal folds of said cover are longitudinally extending pleats of various widths.

11. A typewriter cover consisting of a rectangular flat strip of fabric folded to have a plain central portion and a series of expansible pleats on opposite sides of the plain central portion, each end of the folded strip having the pleats immovably secured together at such ends by stitching extending through all layers of the fabric at such ends.

JESS M. BOVEE.
MARY JANE BOVEE.